(No Model.)

M. MURRAY.
MIRROR ATTACHMENT FOR OPERA GLASSES.

No. 498,019. Patented May 23, 1893.

WITNESSES:
A. O. Babendreier
A. E. Eader

INVENTOR:
Michael Murray
By Chas. B. Mann
Atty

THE NORRIS PETERS CO., PHOTO-LITHO., WASHINGTON, D. C.

UNITED STATES PATENT OFFICE.

MICHAEL MURRAY, OF BALTIMORE, MARYLAND.

MIRROR ATTACHMENT FOR OPERA-GLASSES.

SPECIFICATION forming part of Letters Patent No. 498,019, dated May 23, 1893.

Application filed August 22, 1892. Serial No. 443,728. (No model.)

*To all whom it may concern:*

Be it known that I, MICHAEL MURRAY, a citizen of the United States, residing at Baltimore, in the State of Maryland, have invented certain new and useful Improvements in Mirror Attachments for Opera-Glasses, of which the following is a specification.

This invention relates to a mirror attachment for opera or other binocular glasses; the object is to provide such glasses with a mirror that will reflect objects located behind the person using the glasses.

The invention is illustrated in the accompanying drawings in which—

Figure 1:
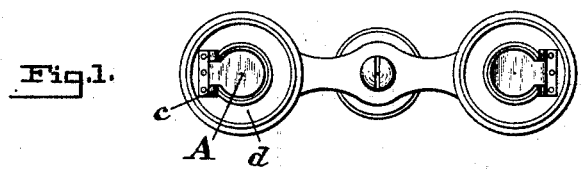
Figure 2:
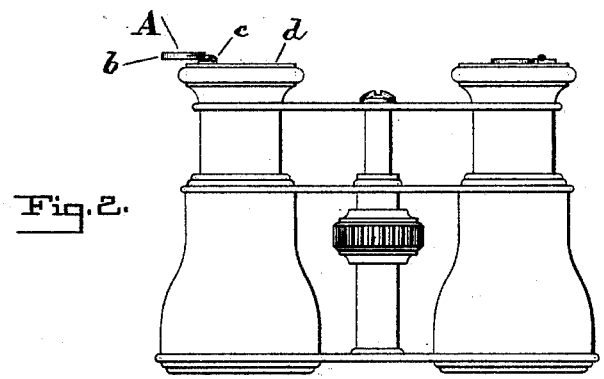
Figure 3:
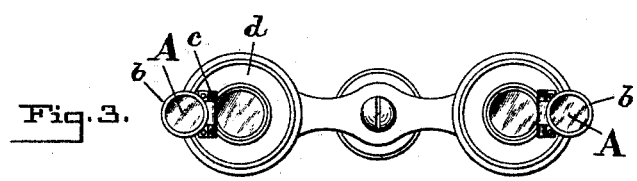
Figure 4:
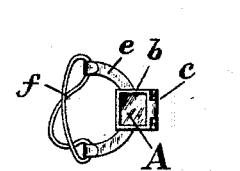
Figure 5:
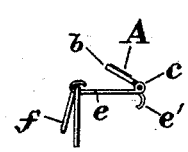
Figure 6:
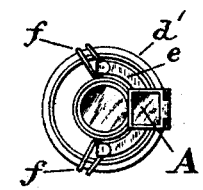
Figure 7:
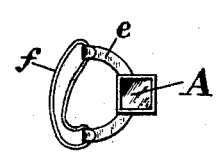

Figure 1 is a view of the eye-piece of an opera glass with the mirror attached—the mirror being closed. Fig. 2 is a side view of an opera glass showing the mirror in the same position as seen in Fig. 1. Fig. 3 is a view of the eye-pieces of an opera-glass showing the mirror open, or in position for use. Figs. 4, 5, and 6 are views showing the mirror as an article detachable or separable from the opera glass. Fig. 7 shows a mirror attachment without the hinge.

The mirror improvement may be applied to any style of opera-glass; it may be permanently secured to the glasses, as in Figs. 1, 2, and 3, or it may be a separate device with means for ready attachment and detachment, as in Figs. 4, 5, 6, and 7.

The glass mirror, A, in practice may have any desired size or shape; the glass is suitably secured in a small metal frame, b, which has a hinge, c, which is suitably attached to the frame, d, which encircles the eye-piece or lens of an opera-glass, see Figs. 1 and 3; the hinge, c, enables the mirror to be turned out, or projected laterally at one side, as in Fig. 3, for use, or to be closed over toward the eye-piece when not in use, as in Fig. 1.

If desired the hinged mirror may be rigidly and permanently secured to the eye-piece frame, d, as in Figs. 1, 2, and 3, or said mirror may be secured to a suitable device which in turn is temporarily attached or fastened to the eye-piece frame, as in Figs. 4 to 7.

As an article separable from the opera-glass, the mirror is provided with a fastening device which, in the present instance, comprises a segment-shaped plate, e, adapted to fit the eye-piece frame, d; this plate has a lip or hook, e', which takes over the edge, d', of the said frame, and to the ends of the plate are attached an elastic cord or band, f, which take under the edge of the said frame at a point diametrically opposite the hook. The plate serves as a base or rest to which the mirror-hinge, c, is attached; the hook, e', and elastic band, f, serve to fasten the plate on the said frame, and these parts constitute means for readily attaching and detaching the mirror.

When the mirror is used as an attachment it need not be hinged, but as shown in Fig. 7 may be without hinge.

By placing the eye-pieces of the opera-glass in the usual position before the eyes, a person's eye may take in the view either through the eye-pieces at objects in front, or may scan objects located at the rear by turning the eye to the small mirrors, A, which reflect the objects.

The relation of the mirror and the hinge, c, with respect to the eye-piece may be varied. In Figs. 1 and 3 the hinge is shown so placed that when the mirror is open for use, the hinge will be nearer to the nose than the mirror; in Figs. 4, 5 and 6 this relation is reversed. Here the hinge is shown so placed that when the mirror is to be used it is nearer the nose than the hinge. In the latter case, when the opera-glass is in the usual position before the eyes, the mirror, A, may be set at any angle, as in Fig. 5, so as to reflect objects located in an oblique rearward direction; this particular relation of the mirror and hinge is, therefore, of advantage.

My improvement is applicable to any telescopic glass.

Having described my invention, what I claim as new, and desire to secure by Letters Patent, is—

1. In a mirror attachment for opera glasses the combination of the segment-shaped plate, e, adapted to fit over the eye-piece frame; a hook, e', adapted to take under the edge of the eyepiece frame; an elastic cord or band which takes under said frame at a point diametrically opposite the hook; and a mirror mounted upon the segment-shaped plate, as described.

2. An attachment for opera glasses comprising a base or rest-piece to engage the edge of an eye-piece frame of the glasses; an elastic band connected with said base or rest and arranged to take over the eye-piece frame; and a mirror carried by said base or rest.

3. In an opera glass the combination of the two frames $d$, surrounding the eye-glass lenses, and a mirror-carrying frame $b$, attached to the side of each of said eye-glass frames by hinges, $c$, so that either one or both of said mirrors may swing side-wise into operative position out of the line of vision through the lenses, whereby when holding the opera glass before the eyes in the usual position both eyes may look forward through the eye-lenses, or either eye may look to one side into the mirror, as described.

In testimony whereof I affix my signature in the presence of two witnesses.

MICHAEL MURRAY.

Witnesses:
    JNO. T. MADDOX,
    CHAS. B. MANN.